United States Patent
Hakariya et al.

(10) Patent No.: US 7,373,238 B2
(45) Date of Patent: May 13, 2008

(54) CONTROL SYSTEM OF INTERNAL COMBUSTION ENGINE

(75) Inventors: Masashi Hakariya, Nagoya (JP); Takashi Tsunooka, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 10/593,635

(22) PCT Filed: Jan. 13, 2006

(86) PCT No.: PCT/JP2006/300780

§ 371 (c)(1), (2), (4) Date: Sep. 21, 2006

(87) PCT Pub. No.: WO2006/075788

PCT Pub. Date: Jul. 20, 2006

(65) Prior Publication Data

US 2007/0244625 A1    Oct. 18, 2007

(30) Foreign Application Priority Data

Jan. 13, 2005  (JP)  ............................. 2005-006036
Feb. 3, 2005   (JP)  ............................. 2005-027487

(51) Int. Cl.
B60T 7/12   (2006.01)
F02M 1/00   (2006.01)

(52) U.S. Cl. ...................... 701/103; 123/434

(58) Field of Classification Search ................ 701/101, 701/102, 103, 104; 123/434, 435, 673
See application file for complete search history.

(56) References Cited

U.S. PATENT DOCUMENTS

| | | | | |
|---|---|---|---|---|
| 5,623,913 A | * | 4/1997 | Kitajima et al. | 123/673 |
| 6,032,656 A | * | 3/2000 | Itoyama et al. | 123/568.21 |
| 6,170,469 B1 | * | 1/2001 | Itoyama et al. | 123/480 |
| 6,298,299 B1 | * | 10/2001 | Itoyama et al. | 701/101 |
| 6,453,229 B1 | * | 9/2002 | Ohkuma et al. | 701/109 |
| 6,820,603 B2 | * | 11/2004 | Yasui et al. | 123/672 |
| 6,840,214 B2 | * | 1/2005 | Yasui | 123/344 |
| 7,003,390 B2 | | 2/2006 | Kaga | |

FOREIGN PATENT DOCUMENTS

| | | |
|---|---|---|
| JP | A 2001-234798 | 8/2001 |
| JP | A 2002-70633 | 3/2002 |
| JP | A 2004-116459 | 4/2004 |
| JP | A 2005-90437 | 4/2005 |

* cited by examiner

Primary Examiner—John T. Kwon
(74) Attorney, Agent, or Firm—Oliff & Berridge, PLC

(57) ABSTRACT

A cylinder air filling amount is divided into a first amount of air and a second amount of air, the first amount of air and the second amount of air are calculated, and the first amount of air and the second amount of air are totaled to calculate a cylinder air filling amount. The first amount of air is the excess of the cylinder air filling amount with respect to the throttle valve air passage amount occurring due to an intake stroke being performed. The drop in intake pressure occurring due to an intake stroke being performed is detected for each cylinder and the total value of the intake pressure drop in a 720° crank angle range is calculated. The first amount of air is calculated based on an intake pressure drop and the intake pressure drop total value. Due to this, it is possible to simply and accurately calculate a cylinder air filling amount.

4 Claims, 12 Drawing Sheets

CONTROL SYSTEM OF INTERNAL COMBUSTION ENGINE

TECHNICAL FIELD

The present invention relates to a control system of an internal combustion engine.

BACKGROUND ART

Regarding an internal combustion engine provided with a plurality of cylinders, introducing air into an intake pipe extending from a throttle valve to an intake valve through the throttle valve in exactly a throttle valve air passage amount, and discharging air from the intake pipe through an intake valve in exactly a cylinder air filling amount to fill a cylinder at the time of an intake stroke, known in the art is a control system of an internal combustion engine wherein a formula obtained from the Law of the Conservation of Mass for the intake pipe and a state equation for the air in the intake pipe is used to calculate the cylinder air filling amount of the cylinder (see Japanese Patent Publication (A) No. 2002-70633).

To use the above formula to calculate a cylinder air filling amount, for example, the temperature of the air in the intake pipe and the volume of the intake pipe have to be found. However, to find the air temperature, for example, not only is a temperature sensor necessary, but also, if considering the response delay, even if using a temperature sensor, it would be difficult to accurately find the air temperature. Further, the intake pipe includes manufacturing error, so the volume of the intake pipe cannot be considered equivalent to, for example, the design value. Measurement of the volume for each intake pipe is also extremely impractical.

Further, when using a formula to estimate a cylinder air filling amount, if using a formula obtained based on the Law of the Conservation of Mass and state equation as it is, the formula would become complicated and the calculation load would become huge, so normally this formula is simplified for use. Here, if the intake valve opening/closing timing is set to the retarded side, an intake valve will remain open even after intake bottom dead center. In this case, even if the piston starts to rise, since the intake valve is held in the open state, the air sucked into the cylinder is liable to flow back into the intake pipe. However, if simplifying the formula for use when estimating the cylinder air filling amount as explained above, this backflow of air is not considered and therefore the calculated cylinder air filling amount ends up including error.

DISCLOSURE OF THE INVENTION

Therefore, the present invention has as its object to provide a control system of an internal combustion engine able to simply and accurately calculate a cylinder air filling amount.

The present invention provides as means for solving this problem a control system of an internal combustion engine as set forth in the claims.

To solve this problem, in a first aspect of the invention, there is provided a control system for an internal combustion engine provided with a plurality of cylinders, introducing air into an intake passage part extending from a throttle valve to an intake valve through the throttle valve in exactly a throttle valve air passage amount, and discharging air from the intake passage part through an intake valve in exactly a cylinder air filling amount to fill a cylinder at the time of an intake stroke, wherein the cylinder air filling amount is divided into a first amount of air and a second amount of air, the first amount of air being an excess of a cylinder air filling amount with respect to a throttle valve air passage amount occurring due to an intake stroke, wherein the control system comprises an intake pressure drop detecting means for detecting a drop in intake pressure occurring due to an intake stroke being performed for each cylinder; a first air amount calculating means for calculating the first amount of air for a cylinder based on its intake pressure drop; a throttle valve air passage amount detecting means for detecting a throttle valve air passage amount; a second air amount calculating means for calculating the second amount of air for a cylinder based on the throttle valve air passage amount; a cylinder air filling amount calculating means for totaling the first amount of air and the second amount of air to calculate the cylinder air filling amount for a cylinder; and a control means for controlling the engine based on the cylinder air filling amount of the cylinder, and wherein the first air amount calculating means sets a set crank angle range so as to include the intake strokes of at least two cylinders for which cylinder air filling amounts are to be calculated, calculates the total value of the intake pressure drop of the cylinders performing an intake stroke in the set crank angle range, and calculates the first amount of air based on each intake pressure drop and the intake pressure drop total value.

Further, in a second aspect of the invention, there is provided the first aspect of the invention wherein when backflow of air from inside a cylinder to the intake passage part occurs at the end of an intake stroke, the action of the second air amount calculating means calculating the second amount of air is prohibited.

To solve the above problem, in a third aspect of the invention, there is provided a control system for an internal combustion engine provided with a plurality of cylinders and a plurality of intake valves, wherein the cylinder air filling amount to a cylinder is divided into a basic amount of air and an excess amount of air flowing from an intake passage part to the inside of the cylinder exceeding a throttle valve air passage flow rate due to opening of an intake valve, and wherein the control system comprises a basic air amount calculating means for calculating a basic air amount based on a throttle valve air passage flow rate of air flowing into the intake passage part through the throttle valve and the opening time of each intake valve; an excess air amount calculating means for calculating an excess air amount based on the drop in intake pressure due to opening of the intake valve; a cylinder air filling amount calculating means for totaling the basic air amount and excess air amount to calculate a cylinder air filling amount to a cylinder; and a control means for controlling the engine based on the cylinder air filling amount to a cylinder, and wherein the basic air amount calculating means calculates a virtual intake valve opening time so that the average air flow rate to all cylinders becomes equal to the throttle air passage flow rate and uses the virtual intake valve opening time as the opening time of an intake valve.

According to the third aspect of the invention, the virtual intake valve opening time becomes a value by which the average air flow rate to all cylinders becomes equal to the throttle air passage flow rate. For this reason, when there is backflow of air from inside a cylinder to the intake pipe, the virtual intake valve opening time becomes shorter than the actual intake valve opening time. If this virtual intake valve opening time is used by the basic air amount calculating means to calculate the basic air amount, the basic air amount can be accurately calculated.

Further, in a fourth aspect of the invention, there is provided the third aspect of the invention wherein the basic air amount calculating means uses the virtual intake valve opening time as the opening times of the intake valves when backflow of air to the intake passage part occurs near the intake valve opening timing or near the intake valve closing timing.

According to the present invention, the cylinder air filling amount can be simply and accurately calculated.

The present invention will be more fully understood from the drawings and the description of preferred embodiments of the present invention.

BEST MODE FOR WORKING THE INVENTION

Figure 1:
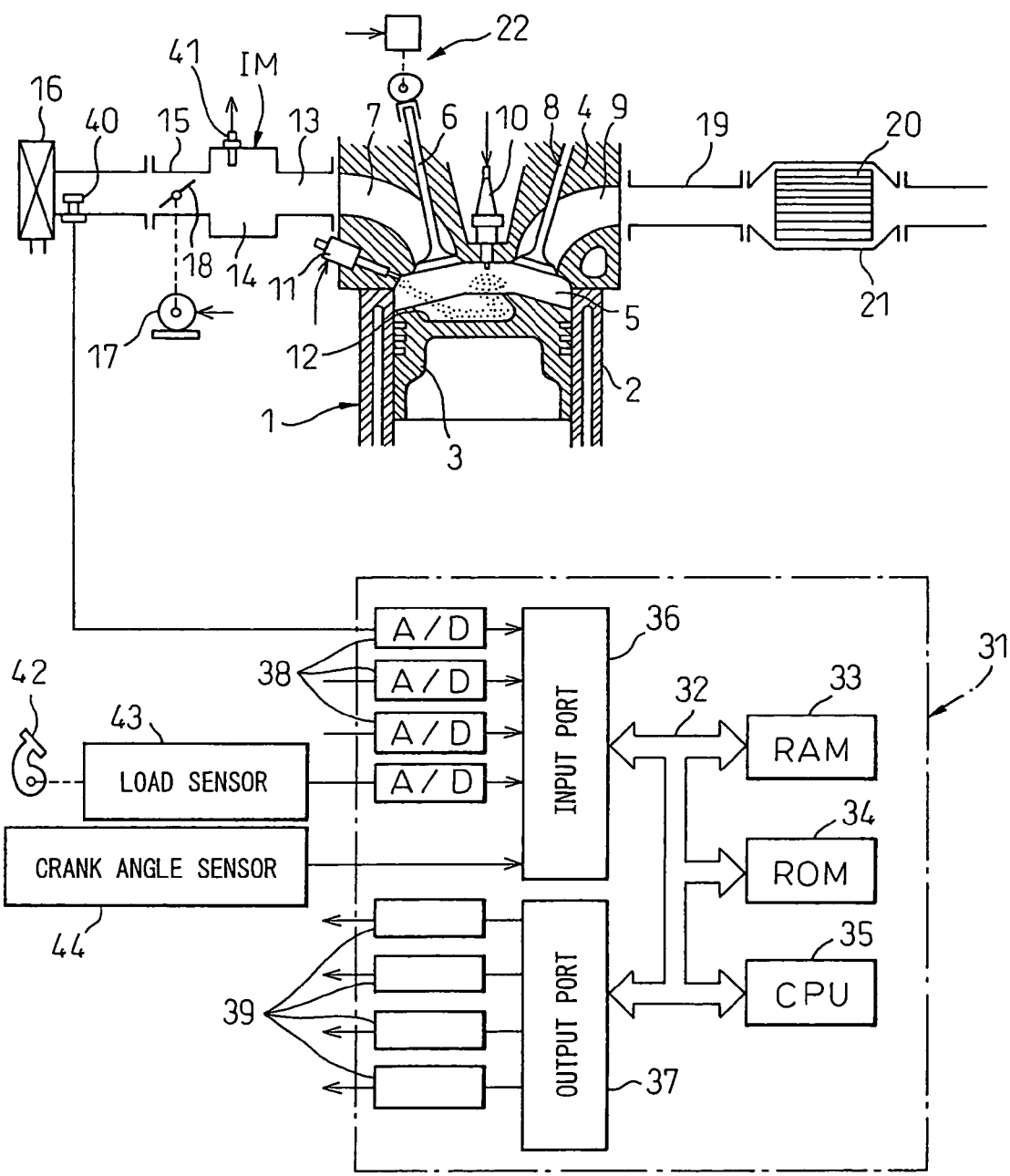
FIG. 1 is an overall view of an internal combustion engine.

Below, embodiments of the present invention will be explained in detail with reference to the drawings. FIG. 1 show the case of application of the present invention to a four-stroke cylinder injection type spark plug ignition type internal combustion engine. Note that the present invention may also be applied to another spark plug ignition type internal combustion engine or a compression ignition type internal combustion engine as well.

As shown in FIG. 1, in the present embodiment, an engine body 1 provided with, for example, eight cylinders is provided with a cylinder block 2, pistons 3 reciprocating in the cylinder block 2, and a cylinder head 4 fixed on the cylinder block 2. Between each piston 3 and the cylinder head 4, a combustion chamber 5 is formed. The cylinder head 4 is provided with, for each cylinder, an intake valve 6, intake port 7, exhaust valve 8, and exhaust port 9. Further, as shown in FIG. 1, at the center of the corresponding part of the inside wall of the cylinder head 4, a spark plug 10 is provided. Near the inside wall of the cylinder head 4, a fuel injector 11 is provided. Further, the piston 3 is formed at its top surface with a cavity 12 extending from below the fuel injector 11 to below the spark plug 10.

The intake port 7 of each cylinder is connected through an intake branch tube 13 to a surge tank 14. The surge tank 14 is connected through an intake pipe 15 to an air cleaner 16. Inside the intake pipe 15 is provided a throttle valve 18 driven by a step motor 17. Note that in this description, the part of the intake passage including the intake pipe 15 downstream of the throttle valve 18, surge tank 14, intake tube 13, and intake port 7, that is, the part of the intake passage from the throttle valve 18 to the intake valve 6, will be called the "intake pipe part IM". On the other hand, the exhaust port 9 of each cylinder is connected through the exhaust branch tube and exhaust pipe 19 to an exhaust purification device 20 built in a catalytic converter 21. This catalytic converter 21 is communicated with the atmosphere through a muffler (not shown).

The intake valve 6 of each cylinder is driven to operate by an intake valve drive system 22. This intake valve drive system 22 is provided with a cam shaft and a switching mechanism for selectively switching a rotational angle of the cam shaft to an advanced side and a retarded side with respect to the crank angle. When the rotational angle of the cam shaft is advanced, as shown by AD in FIG. 2, the opening timing VO and closing timing VC of the intake valve 6 are advanced, therefore the opening/closing timing is advanced. On the other hand, when the rotational angle of the cam shaft is retarded, as shown by RT in FIG. 2, the opening timing VO and closing timing VC of the intake valve 6 are retarded and, therefore, the opening/closing timing is retarded. In this case, the amount of lift and working angle (opening time interval) of the intake valve 6 are maintained and the phase angle (opening timing) is changed. In the internal combustion engine shown in FIG. 1, the rotational angle of the cam shaft is switched to the advanced side or the retarded side in accordance with the engine operating state. Note that the present invention can be applied as well when the opening timing of the intake valve 6 is continuously changed or when the amount of lift or working angle are changed.

Referring to FIG. 1, an electronic control unit (ECU) 31 is comprised of a digital computer provided with components connected to each other through a bi-directional bus 32 such as a RAM (random access memory) 33, ROM (read only memory) 34, CPU (microprocessor) 35, input port 36, and output port 37. The intake pipe 15 upstream of the throttle valve 18 is provided with an air flow meter 40 for detecting the flow rate of air (intake gas) passing through the intake pipe 15. Further, the surge tank 14 is provided with a pressure sensor 41 for detecting the pressure Pm of the air in the intake pipe part IM (below, referred to as the "intake pressure"). Further, the accelerator pedal 42 is connected to a load sensor 43 for generating an output voltage proportional to the amount of depression of the accelerator pedal 42, while the throttle valve 18 is provided with a throttle opening degree sensor (not shown) for detecting an opening degree of the throttle valve 18. The output signals of these sensors 40, 41, and 43 are input through corresponding AD converters 38 to an input port 36. Further, the input port 36 is connected to a crank angle sensor 44 generating an output pulse each time the crank shaft rotates by for example 30°. The CPU 35 uses the output pulse of the crank angle sensor 44 to calculate the engine speed. On the other hand, the output port 37 is connected through corresponding drive circuits 39 to the spark plugs 10, fuel injectors 11, step motors 17, and intake valve drive system 22. These are controlled based on output from the electronic control unit 31.

In the internal combustion engine of the present embodiment, the fuel injection amount (fuel injection time) TAUi of an i-th cylinder (i=1, 2, . . . , 8) is for example calculated based on the following equation (1).

$$TAUi = TAUb \cdot \eta i \cdot k \qquad (1)$$

Here, TAUb indicates the basic fuel injection amount (basic fuel injection time), ηi indicates the air amount variation correction coefficient of the i-th cylinder, and k indicates another correction coefficient.

The basic fuel injection amount TAUb is the fuel injection amount required for making the air-fuel ratio match the target air-fuel ratio. This basic fuel injection amount TAUb is found in advance as a function of the parameters relating to the engine operating conditions (for example, the engine load, the engine speed NE, etc., below referred to as the "operating parameters") and stored in the form of a map in the ROM 34. Alternatively, it is calculated by an equation based on the operating parameters. Further, the correction coefficient k expresses the air-fuel ratio correction coefficient, acceleration increase correction coefficient, etc. combined together and is made 1.0 when no correction is needed.

If the amount of air filled in an i-th cylinder when the intake stroke is completed is referred to as the "cylinder air filling amount Mci(g)", the air amount variation correction coefficient ηi is for compensating for variation in the cylinder air filling amount Mci among the cylinders. The air amount variation correction coefficient ηi of an i-th cylinder is for example calculated based on the following equation (2).

$$\eta i = Mci/Mcave \qquad (2)$$

Here, Mcave indicates an average value of cylinder air filling amounts Mci (=ΣMci/8. Here, "8" expresses the number of cylinders).

For example, if deposits comprised mainly of carbon are formed on the inner circumference of the intake pipe part IM or on the outer circumference of the intake valves 6, since the amount of deposition of the deposits will differ for each cylinder, the cylinder air filling amount Mci is liable to vary among cylinders. Further, there is sometimes manufacturing error among cylinders in the volumes of the combustion chambers 5. In this case as well, the cylinder air filling amount Mci is liable to vary among the cylinders. In the case where the cylinder air filling amount Mci varies among cylinders, if fuel injection amounts are equal among all of the cylinders, the air-fuel ratios or the output torques will vary among cylinders. Therefore, in the present embodiment, the air amount variation correction coefficient ηi is introduced to compensate for variations among cylinders in the cylinder air filling amount.

Note that, considering the fact that the timing at which fuel is actually injected is ahead of the timing of calculation of a fuel injection amount TAUi by exactly a certain time, it is also possible to make the basic fuel injection amount TAUb in equation (1) a predictive value advanced by exactly a certain time from the timing of calculation of the fuel injection amount TAUi by equation (1).

Alternatively, the fuel injection amount TAUi of an i-th cylinder can be calculated based on the following equation (3).

$$TAUi = Mci \cdot kAF \cdot k \qquad (3)$$

Here, kAF is a correction coefficient for making the air-fuel ratio match with a target air flow ratio.

In this case as well, considering the fact that the timing when fuel is actually injected is ahead of the timing of calculation of the fuel injection amount TAU by exactly a certain time, it is also possible to make the cylinder air filling amount Mci in equation (3) a predictive value advanced by exactly a certain time from the timing of calculation of the fuel injection amount TAU.

In this way, both when calculating a fuel injection amount TAUi based on equation (1) and when calculating it based on equation (3), to make the air-fuel ratio match with the target air-fuel ratio for all of the cylinders so as to eliminate the variation of output torque among the cylinders, the cylinder air filling amount Mci has to be accurately found.

In the present embodiment, a cylinder air filling amount Mci is calculated based on the drop of the intake pressure Pm caused by the intake stroke of the i-th cylinder, that is, the intake pressure drop ΔPmdwni. Next, the intake pressure drop ΔPmdwni will be explained while referring to FIG. 3 to FIG. 5.

Figure 3:
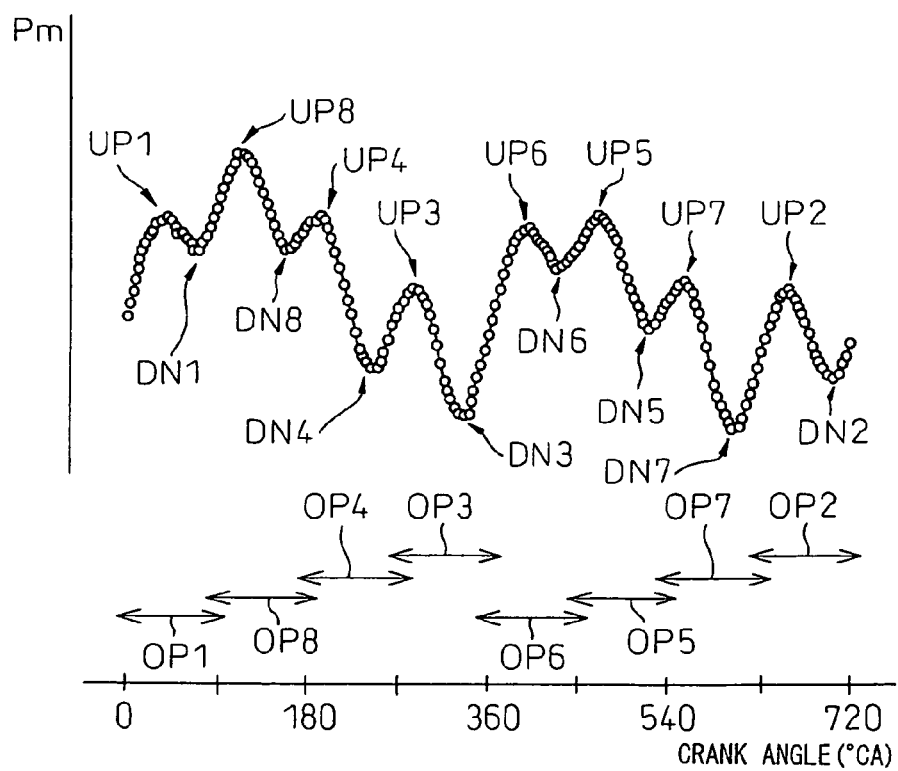
FIG. 3 is a view of the results of detection of an intake pressure Pm.

FIG. 3 shows the intake pressure Pm detected by the pressure sensor 41 at for example constant time intervals over 720° crank angle. The intake order in the internal combustion engine shown in FIG. 3 is #1-#8-#4-#3-#6-#5-#7-#2. In FIG. 3, OPi (i=1, 2, . . . , 8) is the intake valve opening/closing timing of an i-th cylinder, while a 0° crank angle expresses the intake top dead center of the #1 cylinder #1. As will be understood from FIG. 3, when a certain cylinder starts an intake stroke, the rising intake pressure Pm will start to fall and therefore an upward peak will occur in the intake pressure Pm. The intake pressure Pm falls further, then again rises and therefore a downward peak will occur in the intake pressure Pm. In this way, the intake pressure Pm is alternately formed with upward peaks and downward peaks. FIG. 3 shows the upward peaks and the downward peaks caused in the intake pressure Pm due to the intake stroke of an i-th cylinder by UPi and DNi, respectively.

Figure 4:
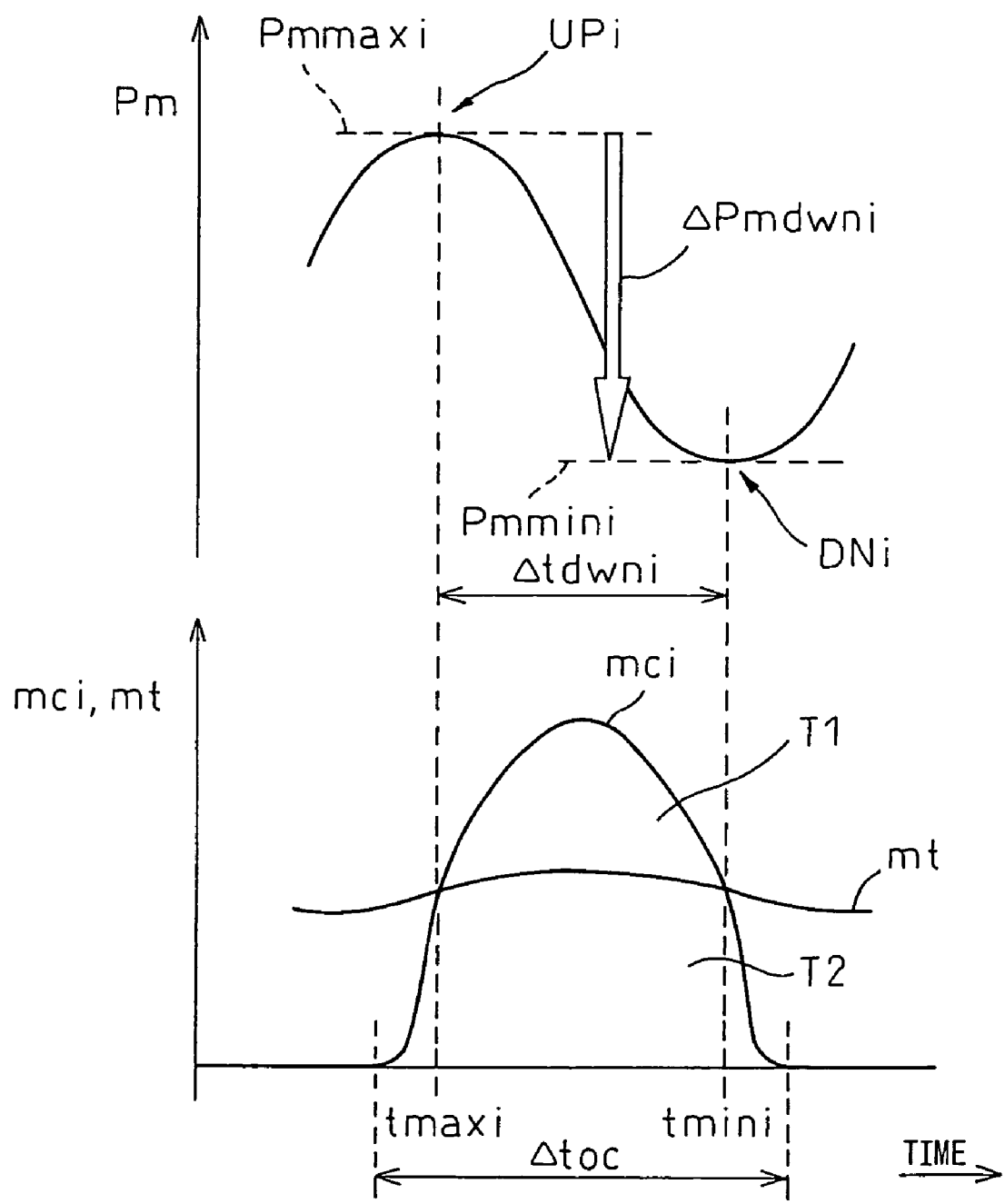
FIG. 4 is a time chart for explaining an intake pressure drop $\Delta Pmdwni$.

As shown in FIG. 4, if the intake pressure Pm at an upward peak UPi is referred to as the maximum value Pmmaxi and the intake pressure Pm at a downward peak DNi is referred to as the minimum value Pmmini, the intake stroke of an i-th cylinder causes the intake pressure Pm to fall from the maximum value Pmmaxi to the minimum value Pmmini. Therefore, the intake pressure drop ΔPmdwni in this case is expressed by the following equation (4):

$$\Delta Pmdwni = Pmmaxi - Pmmini \qquad (4)$$

On the other hand, as shown in FIG. 4, if the intake valve 6 starts to open, the flow rate of air flowing out from the intake pipe part IM and sucked into a cylinder CYL, that is, the cylinder intake air flow rate mci (g/sec, see FIG. 5), starts to increase. Next, when the cylinder intake air flow rate mci becomes larger than the flow rate of air passing through the throttle valve 18 and flowing into the intake pipe part IM, that is, the throttle valve air passage flow rate mt (g/sec, see FIG. 5), the intake pressure Pm starts to drop. Next, when the cylinder intake air flow rate mci drops and becomes smaller than the throttle valve air passage flow rate mt, the intake pressure Pm starts to increase.

That is, air flows into the intake pipe part IM through the throttle valve 18 by exactly the throttle valve air passage flow rate mt, and flows out from the intake pipe part IM through each intake valve 6 by exactly the cylinder intake air flow rate mci when air is taken into the i-th cylinder. In consideration of the above, the amount of outflow, that is, the cylinder intake air flow rate mci, temporarily exceeds the amount of inflow, that is, the throttle valve air passage flow rate mt, so the pressure inside the intake pipe part IM, that is, the intake pressure Pm, falls by exactly the intake pressure drop $\Delta$Pmdwni.

Now, the cylinder air filling amount Mci is the cylinder intake air flow rate mci integrated over time. Therefore, by ignoring the effect of overlap of the intake valve opening/closing timing OPi on the cylinder air filling amount Mci or air amount variation correction coefficient ηi (see FIG. 3), the cylinder air filling amount Mci can be expressed by the following equation (5).

$$Mci = \int_{tmaxi}^{tmini} (mci - mt) dt + mt \cdot \frac{\Delta tdwni + \Delta toc}{2} \qquad (5)$$

Here, tmaxi indicates the timing when an upward peak occurs in the intake pressure Pm, that is, an upward peak generation timing, tmini indicates the timing when a downward peak occurs in the intake pressure Pm, that is, a downward peak generation timing, $\Delta$tdwni indicates the time interval (sec) from the upward peak generation timing tmaxi to the downward peak generation timing tmini, and $\Delta$toc indicates the intake valve opening time (sec) (see FIG. 4).

In equation (5), the right side first term expresses the area of the part shown by T1 in FIG. 4 (below, referred to as the "region T1"), that is, the area of the part surrounded by the cylinder intake air flow rate mci and the throttle valve air passage flow rate mt. The right side second term expresses the area of the part shown by T2 in FIG. 4 (below, referred to as the "region T2"), that is, the area of the part surrounded by the cylinder intake air flow rate mci, the throttle valve air passage flow rate mt, and the line mci=0, approximated by a trapezoid.

As explained above, due to an intake stroke being performed, the cylinder intake air flow rate mci temporarily exceeds the throttle valve air passage flow rate mt. Therefore, the cylinder air filling amount Mci obtained by integrating the cylinder intake air flow rate mci over time exceeds the time integrated value of the throttle valve air passage flow rate mt. The region T1, in this way, expresses the excess of the cylinder air filling amount Mci with respect to the time integrated value of the throttle valve air passage flow rate mt occurring due to an intake stroke being performed.

Therefore, generally speaking, by dividing the cylinder air filling amount into a first amount of air expressed by the area of the region T1 (excess air amount) and a second amount of air expressed by the area of the region T2 (basic air amount), making the first amount of air the excess of the cylinder air filling amount with respect to the throttle valve air passage amount occurring due to an intake stroke being performed, and totaling the first amount of air and the second amount of air for a cylinder, the cylinder air filling amount of the cylinder is calculated.

On the other hand, the Law of the Conservation of Mass for the intake pipe part IM can be expressed by the following equation (6) using the state equation for the air in the intake pipe part IM.

$$\frac{dPm}{dt} = \frac{Ra \cdot Tm}{Vm} \cdot (mt - mci) \qquad (6)$$

Figure 5:
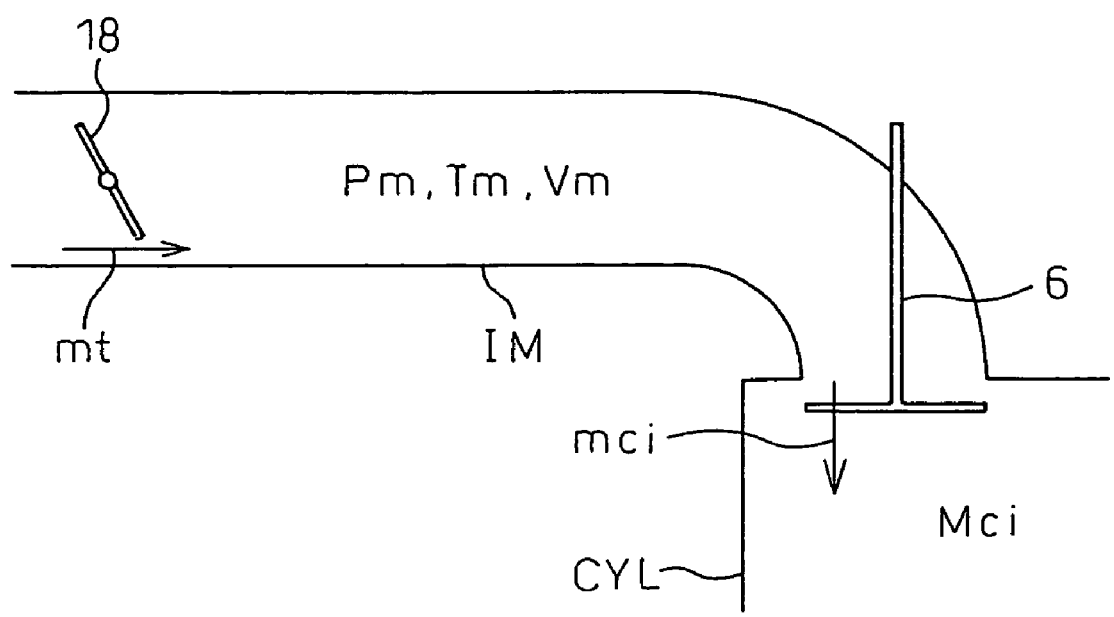
FIG. 5 is a view for explaining a method of calculation of a cylinder air filling amount Mci.

Here, Vm indicates the volume (m$^3$) of the intake pipe portion IM, Ra indicates the gas constant divided by the average molecular weight of air (below, referred to as simply as the "gas constant"), and Tm indicates the temperature (K) of the air in the intake pipe part IM (see FIG. 5).

In the interval from the timing tmaxi to the timing tmini, the intake pressure Pm falls by exactly the intake pressure drop $\Delta$Pmdwni. Therefore, by expressing Vm/(Ra·Tm) by the parameter Km and expressing the throttle valve air passage flow rate mt by the average value mtave, equation (5) can be rewritten using equation (6) to the following equation (7).

$$Mci = \Delta Pmdwni \cdot Km + mtave \cdot \frac{\Delta tdwni + \Delta toc}{2} \qquad (7)$$

This being the case, if detecting the intake pressure Pm by the pressure sensor 41 to calculate the intake pressure drop $\Delta$Pmdwni, finding the above-mentioned parameter Km, detecting the throttle valve air passage flow rate mt by the air flow meter 40 to calculate the average value mtave, and detecting the timings tmaxi, tmini from the intake pressure Pm and throttle valve air passage flow rate average value mtave to calculate the time interval $\Delta$tdwni (=tmini-tmaxi), equation (7) can be used to calculate a cylinder air filling amount Mci. Note that intake valve opening time $\Delta$toc is stored in advance in the ROM 34.

However, as explained at the start, it is difficult to accurately find the intake pipe volume Vm and intake pipe temperature Tm. Therefore, in the present embodiment, the parameter Km is found without finding the intake pipe volume Vm and intake pipe temperature Tm. Next, a method for calculation of the parameter Km of the present embodiment will be explained while referring to FIG. 6A and FIG. 6B.

In the present embodiment, note should be taken of the amount of air flowing into the intake pipe part IM and the amount of air flowing out of the intake pipe part IM in a set crank angle range set so that at least two cylinders for which the cylinder air filling amount Mci is to be calculated are included.

Figure 6A:
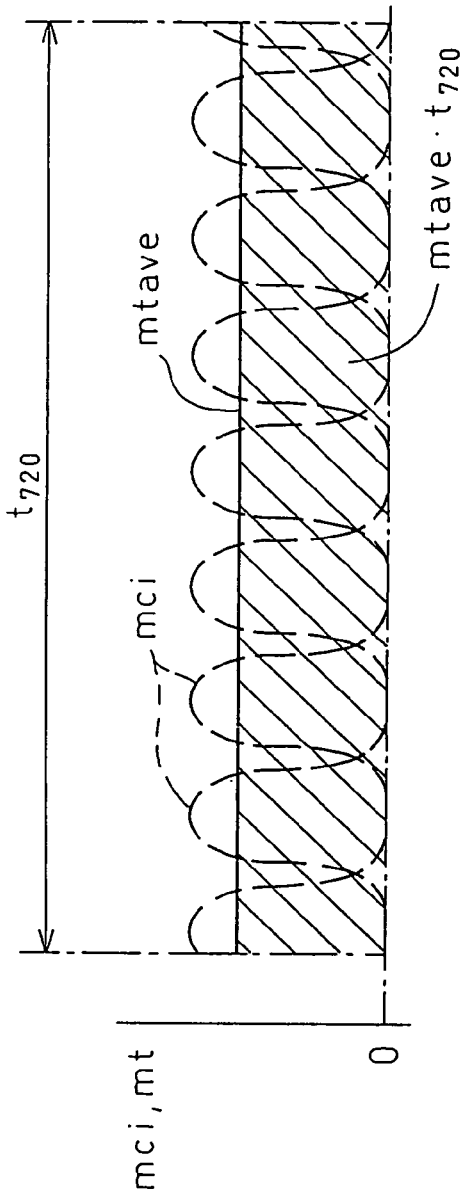
FIG. 6A and FIG. 6B are time charts for explaining a method for calculation of a parameter Km.
Figure 6B:
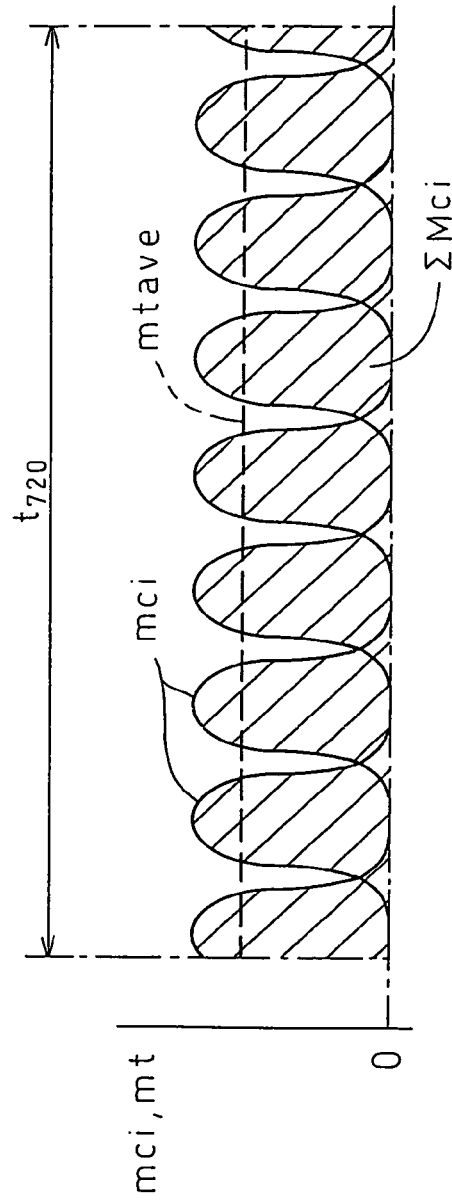

FIG. 6A and FIG. 6B show the case where the 720° crank angle range in which the intake strokes of all cylinders are included, for example, from intake top dead center of the #1 cylinder to the next intake top dead center of the #1 cylinder, is set as the set crank angle range.

The total amount of air flowing into the intake pipe part IM within this 720° crank angle range is expressed as the area of the part shown by hatching in FIG. 6A, that is, the product of the throttle valve air passage flow rate average value mtave in this 720° crank angle range and the required time $t_{720}$ required for the crank shaft to rotate by exactly 720° crank angle (mtave·$t_{720}$). On the other hand, the total amount of air flowing out from the intake pipe part IM to the insides of the cylinders in this 720° crank angle range is expressed as the area of the part shown by hatching in FIG. 6B, that is, the total ΣMci of the cylinder air filling amounts Mci.

If the intake pressure Pm does not change much between the starting point and the end point in the 720° crank angle range, the total amount of air flowing into the intake pipe part IM in this 720° crank angle and the total amount of air flowing out from the intake pipe part IM and filled in each cylinder in this 720° crank angle should be substantially equal to each other. Therefore, in this case, the following equation (8) stands.

$$mtave \cdot t_{720} = \sum_{i=1}^{8} Mci \tag{8}$$

Entering equation (7) at the right side of equation (8) and cleaning it up, the parameter Km can be expressed as in the following equation (9).

$$Km = mtave \cdot \frac{2t_{720} - \sum_{i=1}^{8}(\Delta tdwni + \Delta toc)}{2\sum_{i=1}^{8} \Delta Pmdwni} \tag{9}$$

That is, if calculating the throttle valve air passage flow rate average value mtave from the throttle valve air passage flow rate mt detected by the air flow meter 40, calculating the required time $t_{720}$ from the output of the crank angle sensor 44, calculating the total value $\Sigma \Delta tdwni$ of the time interval $\Delta tdwni$ (see FIG. 4) or the total value $E(\Delta tdwni + \Delta toc)$ of the sum of the time interval $\Delta tdwni$ and the intake valve opening time $\Delta toc$ (see FIG. 4), and calculating the total value $\Sigma \Delta Pmdwni$ of the intake pressure drop $\Delta Pmdwni$, the parameter Km can be calculated. By doing this, the parameter Km can be simply found without finding the intake pipe volume Vm and intake pipe temperature Tm, therefore a cylinder air filling amount Mci can be simply and accurately found.

Figure 7A:
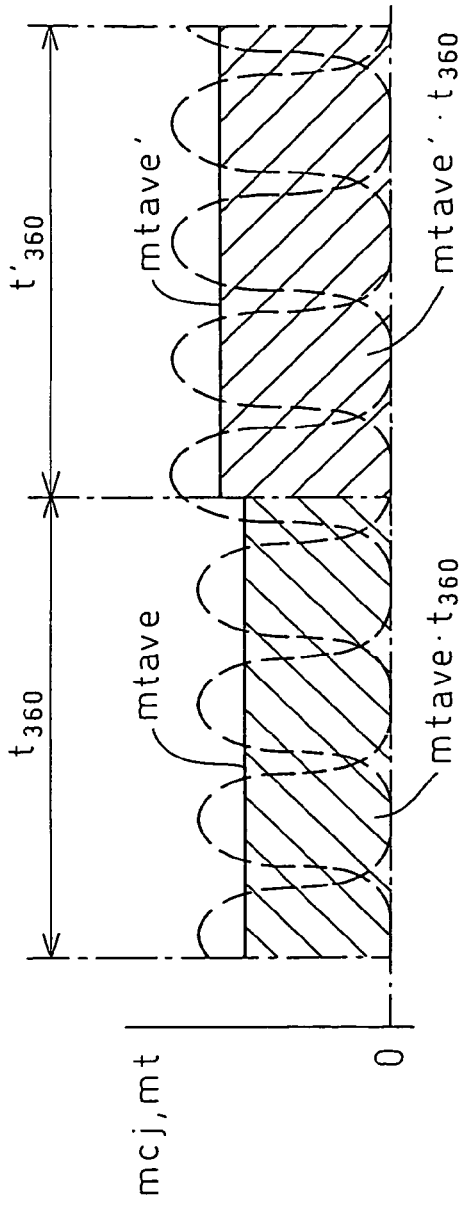
FIG. 7A and FIG. 7B are time charts for explaining another example of a method for calculation of a parameter Km.
Figure 7B:
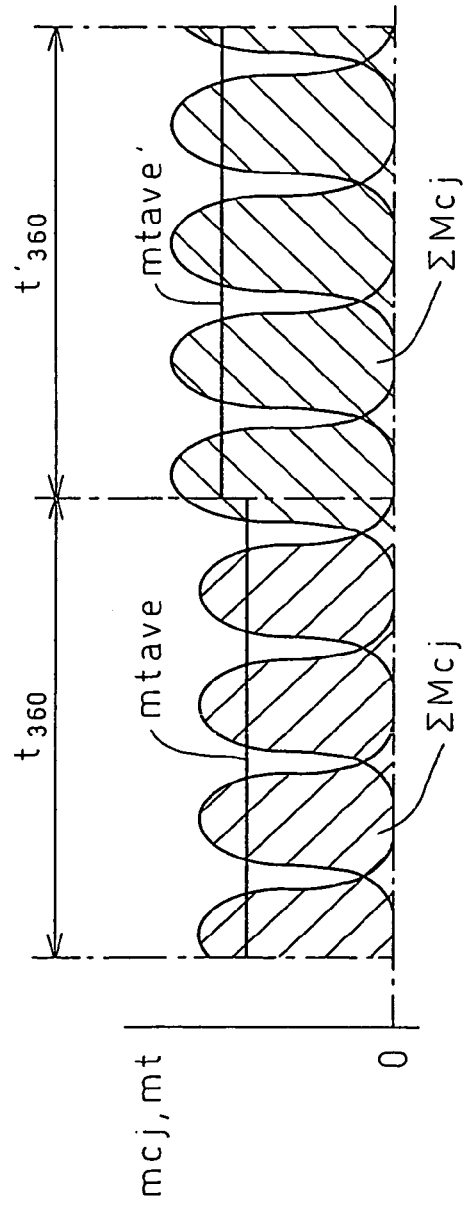

As shown in FIG. 7A and FIG. 7B, for example, it is also possible to set a 360° crank angle range in which the intake strokes of four cylinders are included as the set crank angle range. In the example shown in FIG. 7A and FIG. 7B, a first 360° crank angle range from intake top dead center of the #1 cylinder to intake top dead center of the #6 cylinder and a second 360° crank angle range from intake top dead center of the #6 cylinder to the next intake top dead center of the #1 cylinder are set.

Regarding the first 360° crank angle range, the following equation (10) stands from the throttle valve air passage flow rate average value mtave at the first 360° crank angle range, the required time $t_{360}$ required for the crank shaft to rotate by exactly the first 360° crank angle range, and the total $\Sigma Mcj$ (j=1, 2, 3, 4) of the cylinder air filling amounts Mcj of the cylinders which perform an intake stroke in the first 360° crank angle range. Here, j indicates the order of the intake strokes. Similarly, regarding the second 360° crank angle range, the following equation (11) stands from the throttle valve air passage flow rate average value mtave' at the second 360° crank angle range, the required time $t'_{360}$ required for the crank shaft to rotate by exactly the second 360° crank angle range, and the total $\Sigma Mcj$ (j=5, 6, 7, 8) of the cylinder air filling amounts Mcj of the cylinders performing an intake stroke in the second 360° crank angle range.

$$\sum_{j=1}^{4} Mcj = mtave \cdot t_{360} \tag{10}$$

$$\sum_{j=5}^{8} Mcj = mtave' \cdot t'_{360} \tag{11}$$

Therefore, the parameter Km for the first crank angle range can be expressed by the following equation (12), while the parameter Km for the second crank angle range can be expressed by the following equation (13).

$$Km = mtave \cdot \frac{2t_{360} - \sum_{j=1}^{4}(\Delta tdwnj + \Delta toc)}{2\sum_{j=1}^{4} \Delta Pmdwnj} \tag{12}$$

$$Km = mtave' \cdot \frac{2t'_{360} - \sum_{j=5}^{8}(\Delta tdwnj + \Delta toc)}{2\sum_{j=5}^{8} \Delta Pmdwnj} \tag{13}$$

In this case, the cylinder air filling amounts Mcj (j=1, 2, 3, 4) of the cylinders performing an intake stroke in the first crank angle range are calculated by equation (7) using the parameter Km calculated by equation (12), while the cylinder air filling amounts Mcj (j=5, 6, 7, 8) of the cylinders performing an intake stroke in the second crank angle range are calculated by equation (7) using the parameter Km calculated by equation (13).

Therefore, generally speaking, the set crank angle range is set so that the intake strokes of at least two cylinders for which the cylinder air filling amount is to be calculated are included, the total value $\Sigma \Delta Pmdwni$ of the intake pressure drops $\Delta Pmdwni$ of the cylinders performing intake strokes in this set crank angle range is calculated, and the above-mentioned first amount of air is calculated based on the intake pressure drops $\Delta Pmdwni$ and the intake pressure drop total value $\Sigma \Delta Pmdwni$. Alternatively, it is also possible to view this as calculating the first amount of air based on the intake pressure drops $\Delta Pmdwni$, intake pressure drop total value $F\Delta Pmdwni$, throttle valve air passage flow rate mt or its average value mtave, required time required for the crank shaft to rotate by exactly the set crank angle range, time interval $\Delta tdwni$ from when the intake pressure Pm generates an upward peak UPi (see FIG. 4) to when it reaches a downward peak DNi or its total value $\Sigma \Delta tdwni$, or intake valve opening time $\Delta toc$ or its total value $\Sigma \Delta toc$.

Figure 8:
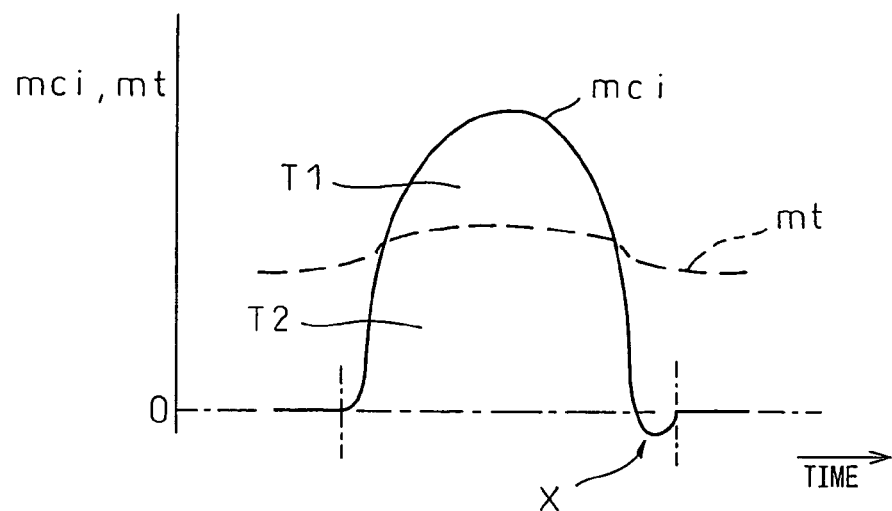
FIG. 8 is a time chart for explaining a cylinder intake air flow rate mci when an intake valve opening/closing timing is set to a retarded side.

However, for example, if the intake valve opening/closing timing is set to the retarded side RT (see FIG. 2), the intake valve closing timing VC will become the intake bottom dead center or later. In this case, even if the piston starts to rise, the intake valve 6 is held in the open state, so the air sucked into the cylinder is liable to flow back into the intake pipe part IM. If this backflow occurs, as shown by X in FIG. 8, the cylinder intake air flow rate mci will temporarily become a negative value and the region T2 can no longer be approximated by a trapezoid. That is, when there is backflow of air from inside a cylinder to the intake pipe part IM at the end of the intake stroke, the cylinder air filling amount Mci cannot be accurately calculated from equation (7).

Therefore, in the present embodiment, when the intake valve opening/closing timing is set at the retarded side RT, the action of calculation of a cylinder air filling amount Mci by equation (7) is prohibited. In this case, the cylinder air filling amount Mci is not updated. The air amount variation correction coefficient ηi is calculated from the cylinder air filling amount Mci calculated at the previous calculation cycle.

Figure 9:
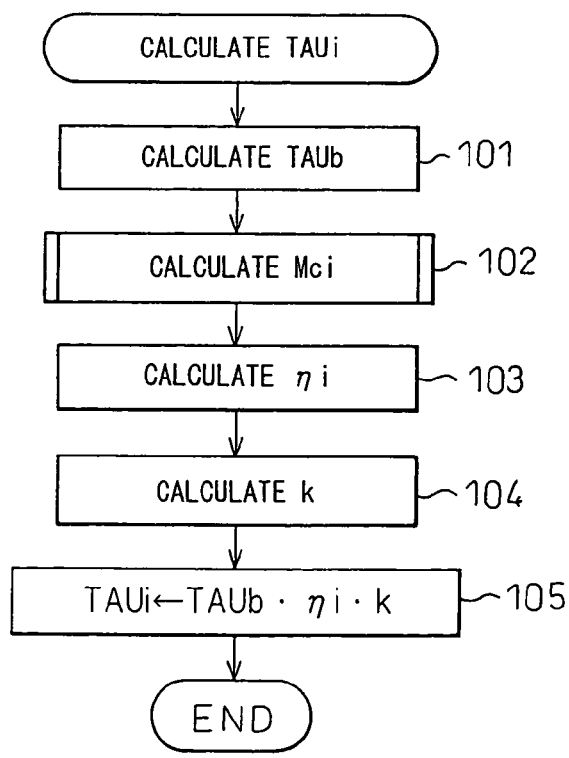
FIG. 9 is a flow chart showing a routine for calculation of a fuel injection time TAUi.

FIG. 9 shows the routine for calculation of the fuel injection amount TAUi of an i-th cylinder of the present embodiment. This routine is executed by interruption every preset crank angle.

Figure 10:
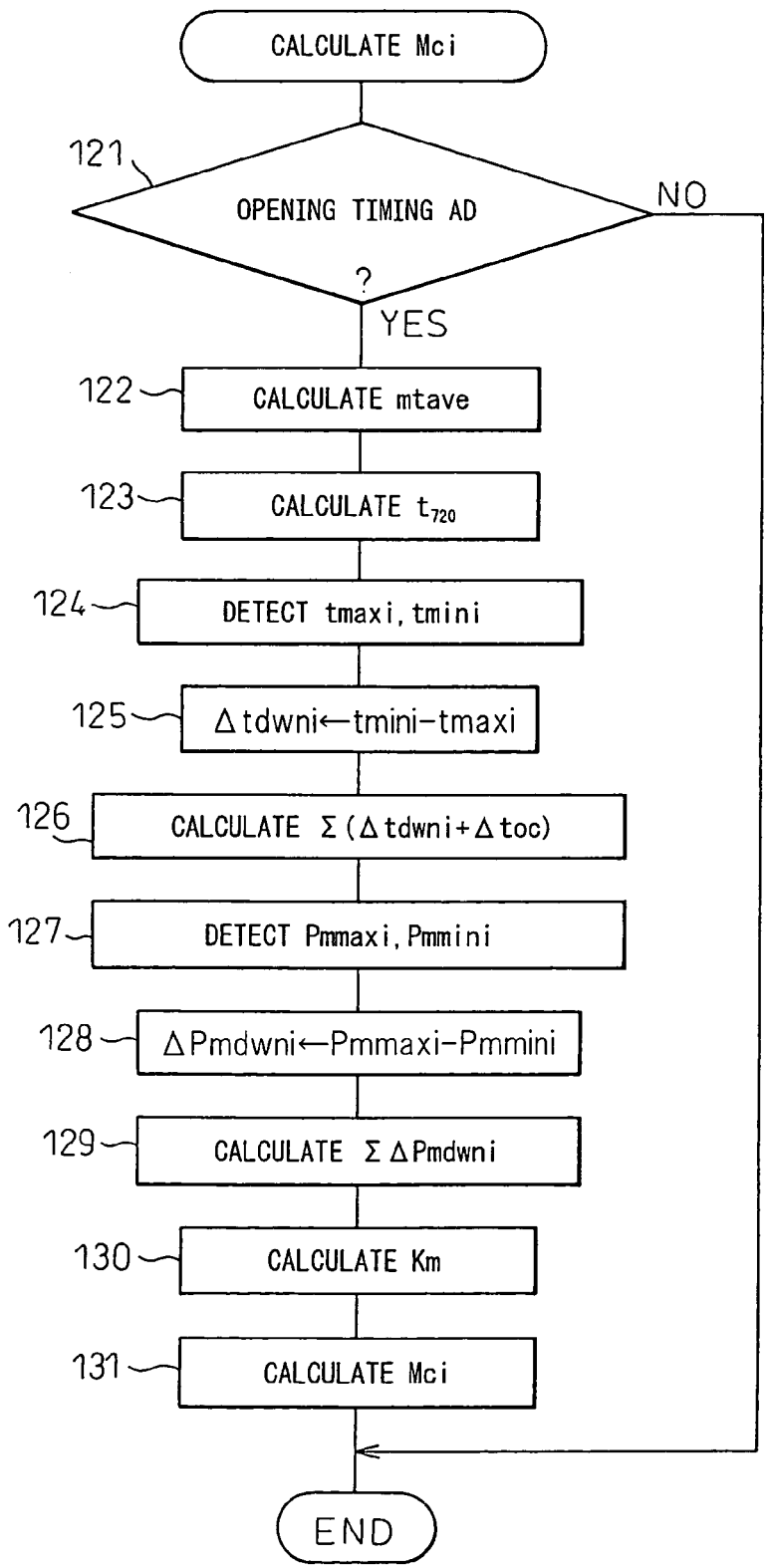
FIG. 10 is a flow chart showing a routine for calculation of a cylinder air filling amount Mci for a first embodiment.

Referring to FIG. 9, at step 101, based on the engine load, the engine speed, etc. detected by the load sensor 43, the crank angle sensor 44, etc., the basic fuel injection amount TAUb is calculated. Next, at step 102, the routine for calculation of the cylinder air filling amount Mci shown in FIG. 10 is executed. Due to this, the cylinder air filling amount Mci for a cylinder is calculated. Next, at step 103, based on the cylinder air filling amount Mci calculated at step 102 and the average value Mcave of the cylinder air filling amount for all cylinders, equation (2) is used to calculate the air amount variation correction coefficient ηi of an i-th cylinder (i=1, 2, . . . , 8). Next, at step 104, the correction coefficient k is calculated. Next, at step 105, based on the basic fuel injection amount TAUb, air amount variation correction coefficient ηi, and correction coefficient k calculated at steps 101, 103, 104, equation (1) is used to calculate the fuel injection amount TAUi. The fuel injector 11 of the i-th cylinder injects fuel by exactly the fuel injection amount TAUi.

FIG. 10 shows the routine for calculation of the cylinder air filling amount Mci of an i-th cylinder in the present embodiment.

Figure 2:
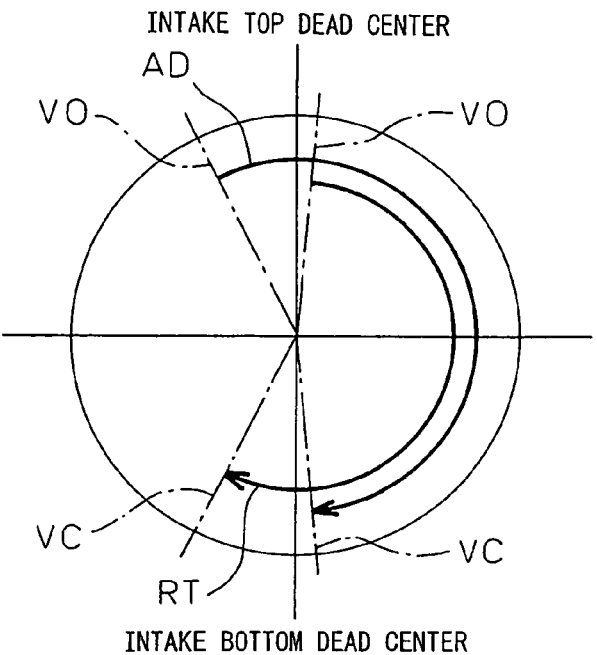
FIG. 2 is a view of an intake valve opening/closing timing.

Referring to FIG. 10, at step 121, it is judged if the opening timing of the intake valve 6 is set at the advanced side AD (see FIG. 2). When the opening timing of the intake valve 6 is set at the advanced side AD, next the routine proceeds to step 122 where the throttle valve air passage flow rate average value mtave is calculated. Next, at step 123, the required time $t_{720}$ is calculated. Next, at step 124, the upward peak generation timings tmaxi and downward peak generation timings tmini for an i-th cylinder are detected (i=1, 2, . . . , 8). Next, at step 125, the time interval Δtdwni of an i-th cylinder is calculated (Δtdwni=tmini−tmaxi). Next, at step 126, Σ(Δtdwni+Δtoc) is calculated. Next, at step 127, the maximum values Pmmaxi and minimum values Pmmini of an i-th cylinder are detected. Next, at step 128, equation (4) is used to calculate the intake pressure drop ΔPmdwni for the i-th cylinder. Next, at step 129, the intake pressure drop total value ΣΔPmdwni is calculated. Next, at step 130, equation (9) is used to calculate the parameter Km. Next, at step 131, equation (7) is used to calculate the cylinder air filling amount Mci for an i-th cylinder. As opposed to this, when at step 121 the opening timing of the intake valve 6 is set at the retarded side RT, the processing cycle is ended. Therefore, calculation of the cylinder air filling amount Mci is prohibited.

In the embodiments explained above, the region T2 shown in FIG. 4 was approximated as a trapezoidal shape having a top side and a bottom side of Δtdwni and Δtoc.

However, the region T2 may also be approximated as a rectangular shape with a side of for example Δtdwni. In this case, the above-mentioned equations (7) and (9) become the following equations (14) and (15).

$$Mci = \Delta Pmdwni \cdot Km + mtave \cdot \Delta tdwni \quad (14)$$

$$Km = mtave \cdot \frac{t_{720} - \sum_{i=1}^{8} \Delta tdwni}{\sum_{i=1}^{8} \Delta Pmdwni} \quad (15)$$

Next, a second embodiment of the present invention will be explained. The equation (6) is modified as in the following equation (16) if expressing Vm/Ra as the parameter Km'.

$$mt - mci = \frac{Km'}{Tm} \cdot \frac{dPm}{dt} \quad (16)$$

In the interval from the timing tmaxi to the timing tmini, the intake pressure Pm falls by exactly the intake pressure drop ΔPmdwni, so the equation (5) can be rewritten using equation (16) to the following equation (17).

$$Mci = \Delta Pmdwni \cdot \frac{Km'}{Tm} + mt \cdot \frac{\Delta tdwni + \Delta toc}{2} \quad (17)$$

This being the case, if detecting the intake pressure Pm by the pressure sensor 41 to calculate the intake pressure drop ΔPmdwni, finding the above-mentioned parameter Km', detecting the throttle valve air passage flow rate mt by the air flow meter 40 to calculate the average value mtave, and detecting the timings tmaxi, tmini from the intake pressure Pm to calculate the time interval Δtdwni (=tmini−tmaxi), equation (17) can be used to calculate the cylinder air filling amount Mci. Note that in equation (17), the intake valve opening time Δtoc is a value instructed from the ECU 31 to the intake valve drive system 22, therefore is the time when the intake valve 6 actually is open.

Figure 11:
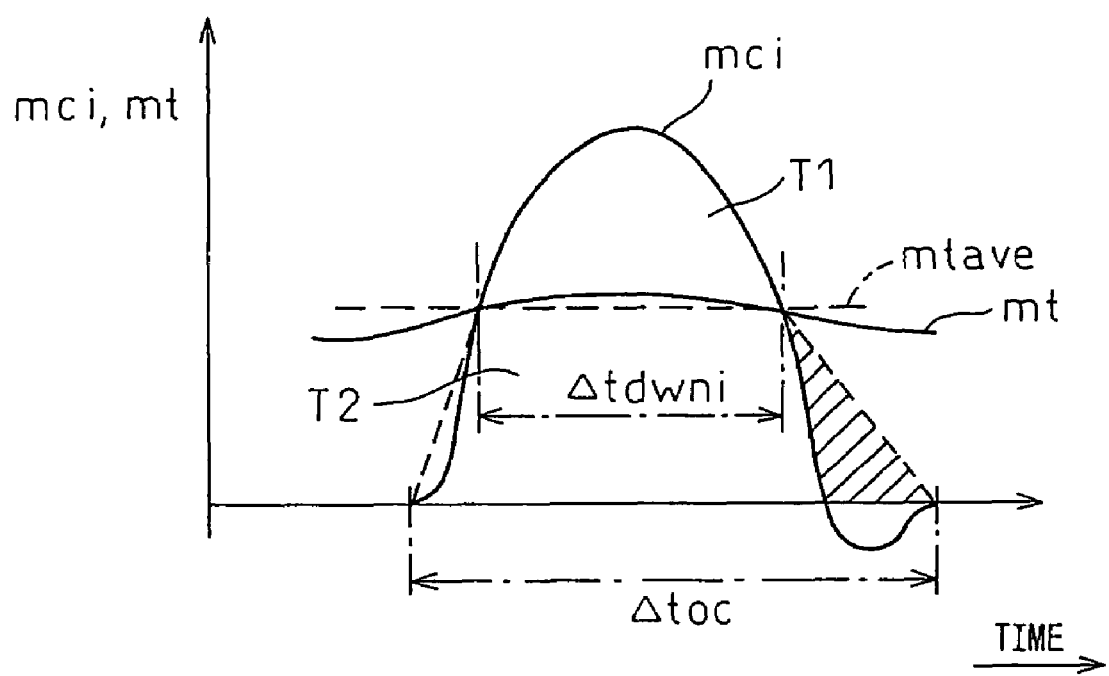
FIG. 11 is a time chart for explaining error in approximation.

However, as explained at the start, due to the backflow of the air sucked into a cylinder to the inside of the intake pipe or other factors, if calculating the cylinder air filling amount as explained above, the cylinder air filling amount ends up including an error. That is, the right side second term of equation (17) approximates the region T2 of FIG. 4 by a trapezoid. However, when backflow of air, etc., occurs, the value calculated by approximation by the right side second term of equation (17) ends up greater than the region T2 by exactly the amount shown by the hatching in FIG. 11 and, as a result, the cylinder air filling amount is calculated greater and error ends up occurring. In other words, if making the intake valve opening time Δtoc a value equal to the time when an intake valve 6 actually opens, the value calculated by approximation by the right side second term of equation (17) will end up including error.

Therefore, in the present invention, by adjusting the intake valve opening time Δtoc to a suitable value rather than making it the time during which an intake valve 6 actually opens, even if air flows back etc., the region T2 can be calculated with a high precision. Below, while referring to FIG. 12A, FIG. 12B and FIG. 13, the method of calculation of the cylinder air filling amount in the present invention will be explained.

Figure 12A:
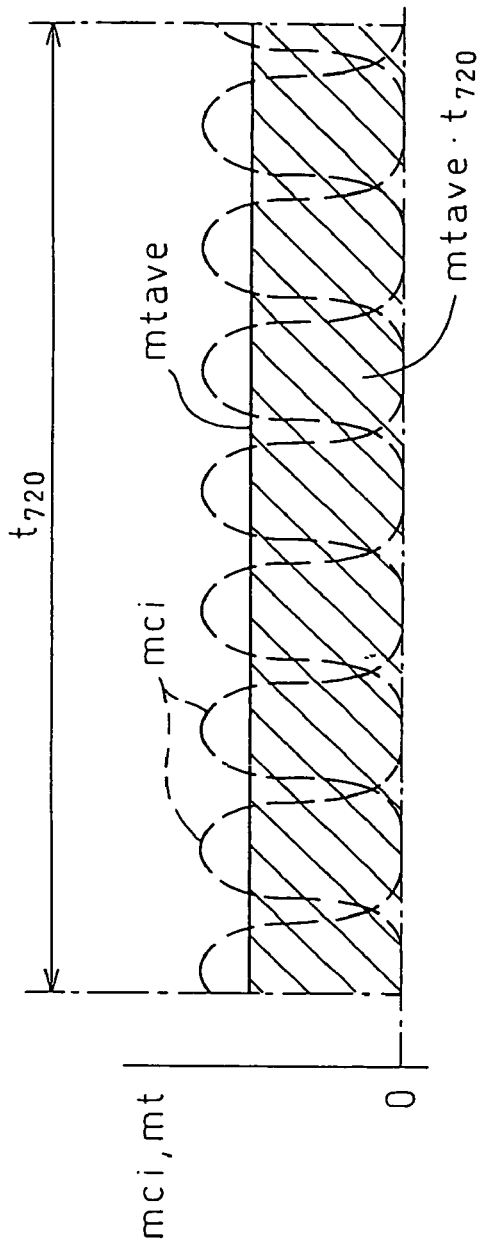
FIG. 12A and FIG. 12B are time charts for explaining a method of calculation of a virtual intake valve opening time x.
Figure 12B:
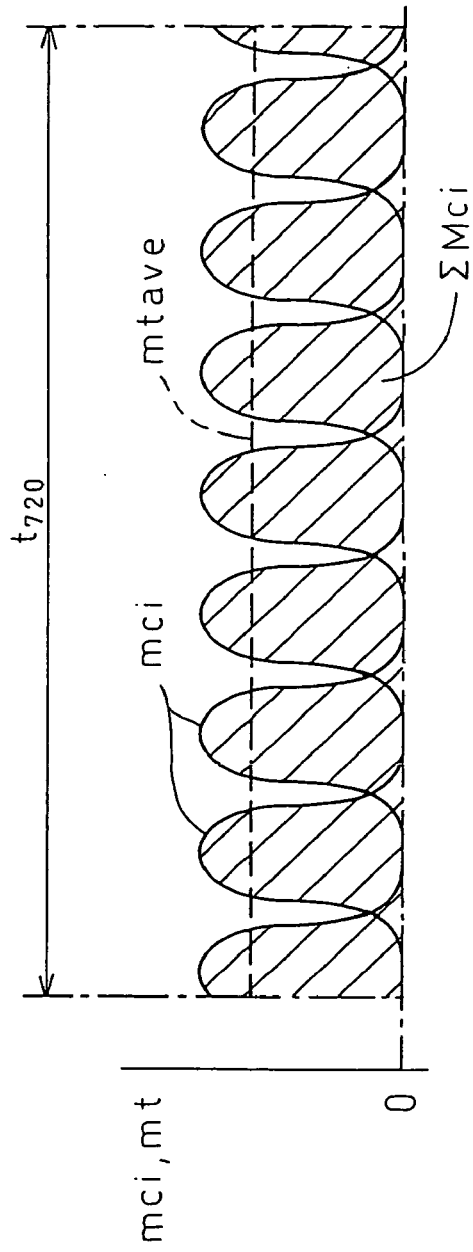

FIG. 12A and FIG. 12B show the cylinder air filling flow rate mci and throttle valve air passage flow rate average value mtave for all cylinders in the crank angle 720° from intake top dead center of the #1 cylinder to the next intake top dead center of the #1 cylinder.

The total amount of air flowing into the intake pipe part IM during this crank angle 720° is the area of the part shown by hatching in FIG. 12A, that is, is expressed by the product of the throttle valve air passage flow rate average value mtave during this crank angle 720° and the required time $t_{720}$ required for the crank shaft to rotate by exactly the crank angle 720° (mtave·$t_{720}$). On the other hand, the total amount of air flowing out from the intake pipe portion IM and being filled into the cylinders during this crank angle 720° is expressed as the area of the part shown by hatching in FIG. 12B, that is, the total ΣMci of the cylinder air filling amount Mci.

If the intake pressure Pm does not change much at all between the starting point and end point of the crank angle 720°, during this crank angle 720°, the total amount of air flowing into the intake pipe part IM and the total amount of air flowing out from the intake pipe part IM and being filled into the cylinders should be substantially the same. Therefore, in this case, the following equation (18) stands.

$$mtave \cdot t_{720} = \sum_{i=8}^{8} Mci \quad (18)$$

Further, if entering equation (17) at the right side of equation (18) and cleaning it up, it can be expressed as the following equation (19).

$$mtave \cdot t_{720} = \sum_{i=8}^{8} \Delta Pmdwni \cdot \frac{Km'}{Tmave} + mtave \cdot \frac{\sum_{i=1}^{8} \Delta tdwni + \Delta toc \cdot 8}{2} \quad (19)$$

Here, Tmave indicates the air temperature average value in the intake pipe part IM during a crank angle 720°.

However, equation (19) may not stand in practice. This is because, as explained above, by making the intake valve opening time Δtoc a value equal to the time for which an intake valve 6 actually opens, the right side second term of equation (17) causes an error to arise in the value calculated by approximation.

Therefore, in the present invention, for the equation (19), the intake valve opening time Δtoc is replaced by use of the variable x. In this case, the equation (19) is expressed as the following equation (20).

$$mtave \cdot t_{720} = \sum_{i=8}^{8} \Delta Pmdwni \cdot \frac{Km'}{Tmave} + mtave \cdot \frac{\sum_{i=1}^{8} \Delta tdwni + x \cdot 8}{2} \quad (20)$$

Further, by cleaning up equation (20) for the variable x, it can be expressed as the following equation (21).

$$x = \frac{t_{720}}{4} - \frac{\sum_{i=1}^{8} \Delta tdwni}{8} - \frac{Km'}{Tmave} \cdot \frac{\sum_{i=1}^{8} \Delta Pmdwni}{4 \cdot mtave} \quad (21)$$

Figure 13:
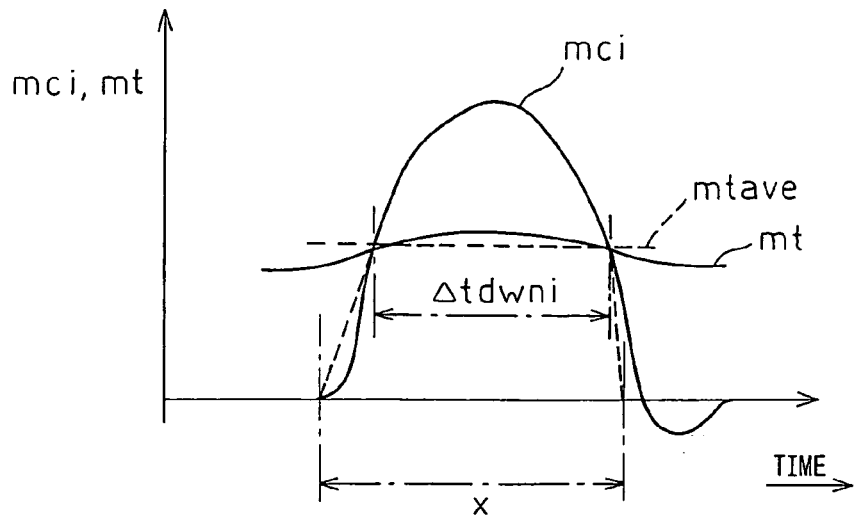
FIG. 13 is a time chart for explaining a method of calculation of the virtual intake valve opening time x.

The thus calculated variable x is a value corresponding to the intake valve opening time Δtoc and a value determined when assuming that the total amount of air flowing into the intake pipe part IM during the crank angle 720° and the total amount of air flowing out from the intake pipe part IM and being filled in the cylinders during the crank angle 720° are equal (below, referred to as the "virtual intake valve opening time"). That is, the virtual intake valve opening time x is a value set so that the area of the part surrounded by broken lines in FIG. 13 (that is, the trapezoidal part with a top side of Δtdwni, a bottom side of the virtual intake valve opening time x, and a height of mtave) becomes equal to the area of the part surrounded by the cylinder intake air flow rate mci, the throttle valve air passage flow rate mtave, and the line mci=0 (region T2). However, FIG. 13 shows the case for one cylinder, but in actuality, the virtual intake valve opening time x is set so that the total value for all cylinders of the areas of the parts surrounded by the broken lines becomes equal to the total value for all cylinders of the areas of the regions T2.

On the other hand, equation (17) becomes the following equation (22) by using the variable x instead of Δtoc:

$$Mci = \Delta Pmdwni \cdot \frac{Km'}{Tm} + mt \cdot \frac{\Delta tdwni + x}{2} \quad (22)$$

Further, by entering the value of the variable x calculated by equation (21) into equation (22), the cylinder air filling amount of each cylinder is accurately calculated.

That is, according to the present invention, a virtual intake valve opening time whereby the average air flow rate to all cylinders becomes equal to the throttle air passage flow rate is calculated. By using the virtual intake valve opening time as the opening time of an intake valve to calculate the region T2, it is possible to accurately calculate the cylinder air filling amount to each cylinder.

Figure 14:
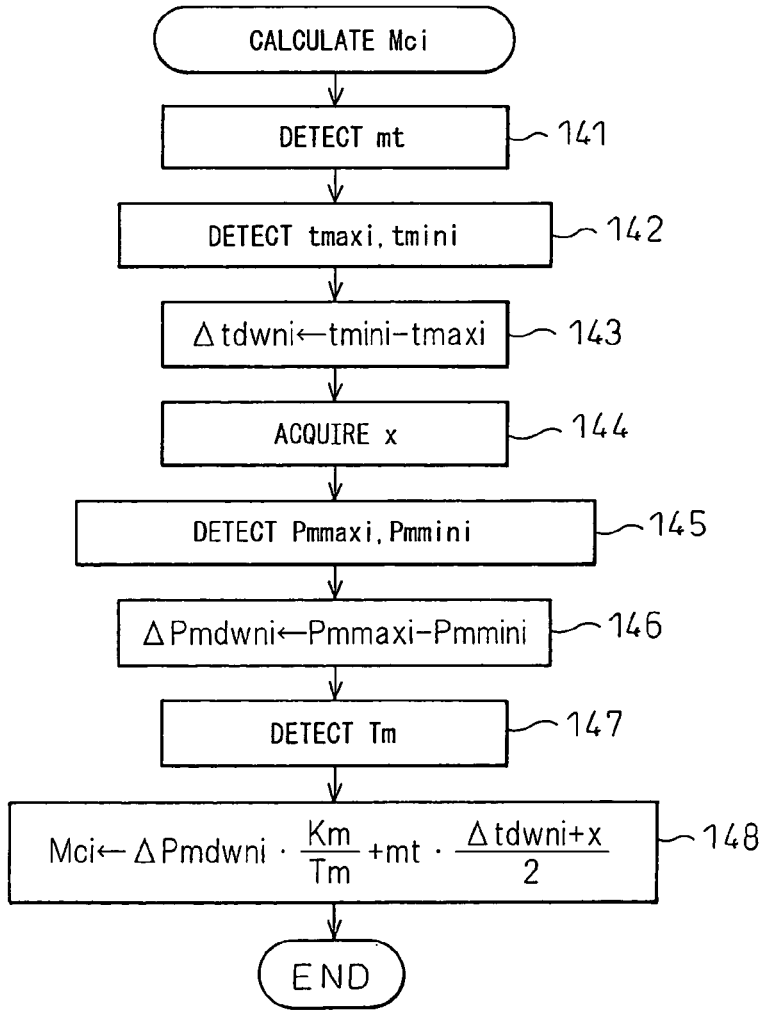
FIG. 14 is a flow chart showing a routine for calculation of a cylinder air filling amount Mci for a second embodiment.

FIG. 14 shows a routine for calculation of the cylinder air filling amount Mci of an i-th cylinder according to a second embodiment. In the second embodiment, instead of the calculation routine shown in FIG. 10 of the first embodiment, the calculation routine shown in FIG. 14 is used to calculate the cylinder air filling amount Mci of the i-th cylinder.

Referring to FIG. 14, at step 141, a throttle valve air passage flow rate mt is detected from the output of the air flow meter 40 etc. Next, at step 142, from the output of the pressure sensor 41, the upward peak generation timing tmaxi and downward peak generation timing tmini of the intake pressure due to the intake valve 6 of an i-th cylinder opening are detected (i=1, 2, . . . , 8). Next, at step 143, based on the peak generation timings tmaxi and tmini detected at step 142, the time interval Δtdwni of an i-th cylinder is calculated (Δtdwni=tmini−tmaxi). Next, at step 144, the calculation routine of the virtual intake valve opening time x shown in FIG. 15 is used to obtain the calculated variable x.

At step 145, from the output of the pressure sensor 41, the maximum value Pmmaxi and minimum value Pmmini of intake pressure due to the intake valve 6 of an i-th cylinder opening are detected. Next, at step 146, based on the maximum value Pmmaxi and minimum value Pmmini detected at step 145, equation (4) is used to calculate the intake pressure drop ΔPmdwni of the i-th cylinder. At step 147, based on the output of a temperature sensor (not shown) etc., the temperature Tm of the intake pipe part IM is detected. Further, at step 148, based on the mt, Δtdwni, x, ΔPmdwni, and Tm calculated at steps 141, 143, 144, 146 and 147, equation (22) is used to calculate the cylinder air filling amount Mci to a cylinder. The calculated cylinder air filling amount Mci to a cylinder is used for calculation of the fuel injection amount TAUi to the cylinder shown in FIG. 9.

Figure 15:
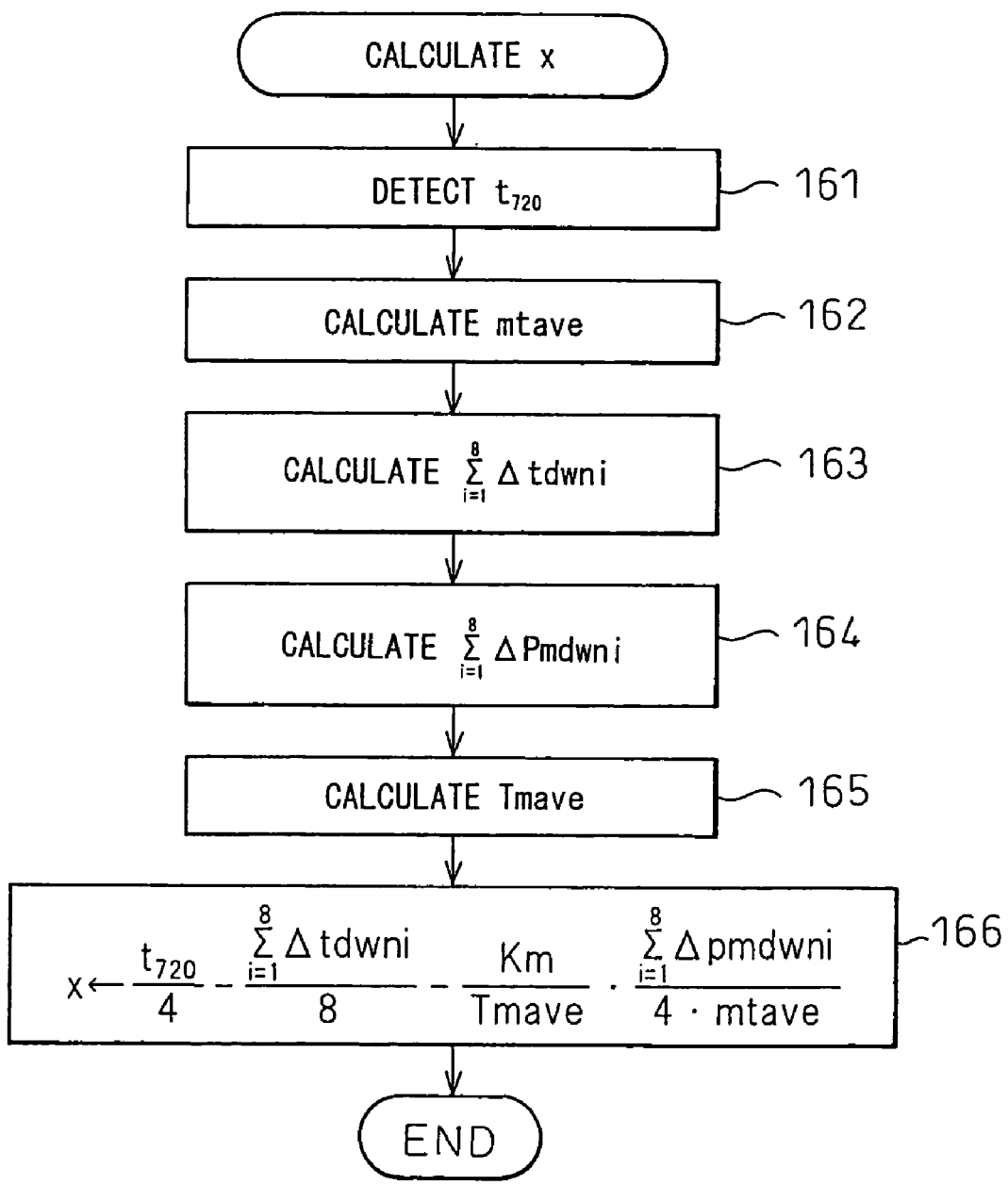
FIG. 15 is a flow chart showing the routine for calculation of the value of a variable x.

FIG. 15 shows the routine for calculation of the variable x according to an embodiment of the present invention. This calculation routine is performed each time the crank shaft rotates by 720°.

Referring to FIG. 15, at step 161, based on the output of the crank angle sensor 44 etc., the time $t_{720}$ required for the crank shaft to rotate by 720° is calculated. Next, at step 162, from the output of the air flow meter 40 etc., the average value mtave of the throttle air passage flow rate while the crank shaft is rotating by 720° is calculated. Next, at step 163, the time interval Δtdwni calculated at step 143 of FIG. 14 is totaled up for all of the cylinders to calculate EΔtdwni. At step 164, the intake pressure drop ΔPmdwni calculated at step 146 of FIG. 14 is totaled up for all of the cylinders to calculate FΔPmdwni. Next, at step 165, based on the output of the temperature sensor, the average value Tmave of the temperature in the intake pipe part IM is calculated. Next, at step 166, based on the $t_{720}$, mtave, ΣΔtdwni, ΣΔPmdwni, and Tmave calculated at steps 161, 162, 163, 164, and 165, equation (21) is used to calculate the value of the variable x.

Note that as explained above, equation (21) is conditional on the intake pressure Pm not changing much between the starting point and end point of the crank angle 720°, so it is preferable to calculate the cylinder air filling amount Mci only at the time of steady-state operation and to suspend the calculation of the cylinder air filling amount Mci at the time of a transitory operation where the intake pressure Pm easily fluctuates between the starting point and end point of the crank angle 720°. Here, the "steady-state operation" means for example the time of operation under an engine load or an engine speed which is substantially constant, while the "transitory operation" means for example the time of operation under an engine load or an engine speed which fluctuates.

Further, in the above explanation, the present invention was applied to the case where the intake valve opening/closing timing was set to the retarded side, an intake valve was open even after intake bottom dead center, and therefore the air sucked into a cylinder flowed back into the intake pipe. However, the present invention can be applied not only to this case, but also for example the case where the intake valve opening/closing timing is set to the advanced side, an intake valve opens from before intake top dead center, and due to this air does not flow into the intake pipe even while the intake valve is open.

Note that while the present invention was explained in detail based on specific embodiments, a person skilled in the art could make various changes, modifications, etc. without departing from the claims and idea of the present invention.

The invention claimed is:

1. A control system for an internal combustion engine provided with a plurality of cylinders, introducing air into an intake passage part extending from a throttle valve to an intake valve through the throttle valve in exactly a throttle valve air passage amount, and discharging air from the intake passage part through an intake valve in exactly a cylinder air filling amount to fill a cylinder at the time of an intake stroke, wherein the cylinder air filling amount is divided into a first amount of air and a second amount of air, the first amount of air being an excess of a cylinder air filling amount with respect to a throttle valve air passage amount occurring due to an intake stroke, wherein the control system comprises an intake pressure drop detecting means for detecting a drop in intake pressure occurring due to an intake stroke being performed, for each cylinder, a first air amount calculating means for calculating the first amount of air for a cylinder based on its intake pressure drop;

a throttle valve air passage amount detecting means for detecting a throttle valve air passage amount;

a second air amount calculating means for calculating the second amount of air for a cylinder based on the throttle valve air passage amount;

a cylinder air filling amount calculating means for totaling the first amount of air and the second amount of air to calculate the cylinder air filling amount for a cylinder; and a control means for controlling the engine based on the cylinder air filling amount of the cylinder, and wherein the first air amount calculating means sets a set crank angle range so as to include the intake strokes of at least two cylinders for which cylinder air filling amounts are to be calculated, calculates the total value of the intake pressure drop of the cylinders performing an intake stroke in the set crank angle range, and calculates the first amount of air based on each intake pressure drop and the intake pressure drop total value.

2. A control system for an internal combustion engine as set forth in claim 1 wherein, when backflow of air from inside a cylinder to the intake passage part occurs at the end of an intake stroke, the action of the second air amount calculating means calculating the second amount of air is prohibited.

3. A control system for an internal combustion engine provided with a plurality of cylinders and a plurality of intake valves, wherein the cylinder air filling amount to a cylinder is divided into a basic amount of air and an excess amount of air flowing from an intake passage part to the inside of the cylinder exceeding a throttle valve air passage flow rate due to opening of an intake valve, wherein the control system comprises a basic air amount calculating means for calculating a basic air amount based on a throttle valve air passage flow rate of air flowing into the intake passage part through the throttle valve and the opening time of each intake valve;

an excess air amount calculating means for calculating an excess air amount based on the drop in intake pressure due to opening of said intake valve;

a cylinder air filling amount calculating means for totaling said basic air amount and excess air amount to calculate a cylinder air filling amount to a cylinder; and a control means for controlling the engine based on the cylinder air filling amount to a cylinder, and wherein said basic air amount calculating means calculates a virtual intake valve opening time so that the average air flow rate to all cylinders becomes equal to the throttle air passage flow rate and uses said virtual intake valve opening time as the opening time of an intake valve.

4. A control system as set forth in claim 3, wherein said basic air amount calculating means uses said virtual intake valve opening time as the opening time of an intake valve when backflow of air to the intake passage part occurs near the intake valve opening timing or near the intake valve closing timing.

* * * * *